United States Patent [19]

Gebhardt

[11] Patent Number: 4,773,621
[45] Date of Patent: Sep. 27, 1988

[54] ADJUSTABLE APPLIANCE POSITIONING MECHANISM

[76] Inventor: Robert J. Gebhardt, Box 282, Waltham, Minn. 55982

[21] Appl. No.: 70,176

[22] Filed: Jul. 6, 1987

[51] Int. Cl.⁴ .......................................... F16M 11/10
[52] U.S. Cl. ..................................... 248/122; 248/291
[58] Field of Search ............... 248/122, 161, 296, 299, 248/188.5, 183, 127, 284, 291

[56] References Cited

U.S. PATENT DOCUMENTS

| | | | |
|---|---|---|---|
| 110,434 | 12/1870 | Clarke | 248/291 X |
| 257,050 | 4/1882 | Munson | 248/291 X |
| 504,717 | 9/1893 | Fanckboner | 248/291 X |
| 691,270 | 1/1902 | Jones | 248/122 X |
| 691,270 | 1/1902 | Jones | 248/122 |
| 835,678 | 11/1906 | Hammond | 248/124 |
| 1,130,689 | 3/1915 | Atkinson | 248/299 X |
| 1,284,010 | 11/1918 | Wilbur | 248/103 |
| 1,449,658 | 3/1923 | Deach | 248/286 |
| 1,774,775 | 9/1930 | Weitz | 248/299 |
| 2,299,683 | 10/1930 | Curtis | 248/122 |
| 2,358,844 | 9/1944 | Woodward | 248/122 |
| 2,366,950 | 1/1945 | Wright | 248/122 |
| 2,532,173 | 11/1950 | Lewis | 248/286 |
| 2,614,861 | 10/1952 | Van Horn | 248/299 X |
| 2,642,244 | 6/1953 | Beach, Jr. | 248/291 |
| 2,697,776 | 12/1954 | Wale | 248/291 X |
| 2,709,565 | 5/1955 | Tousignant | 248/278 |
| 2,727,707 | 12/1955 | Wells | 248/278 |
| 2,749,196 | 6/1956 | Wolfe | 248/287 X |
| 2,763,453 | 9/1956 | Palino | 248/122 |
| 2,947,306 | 8/1960 | Culkin | 248/287 |
| 3,196,875 | 7/1965 | Pfeiffer | 248/286 |

Primary Examiner—Ramon S. Britts
Assistant Examiner—Karen J. Chotkowski
Attorney, Agent, or Firm—William J. Ryan

[57] ABSTRACT

An adjustable appliance positioning mechanism comprising a standard having a lower base portion, a boom-carrying sleeve pivotally attached to the upper end of said standard, an appliance carrying boom received in said sleeve and longitudinally positionable with respect to said sleeve and a single means for locking said boom against longitudinal motion with respect to said sleeve and for also locking said sleeve against rotational motion with respect to said standard.

3 Claims, 1 Drawing Sheet

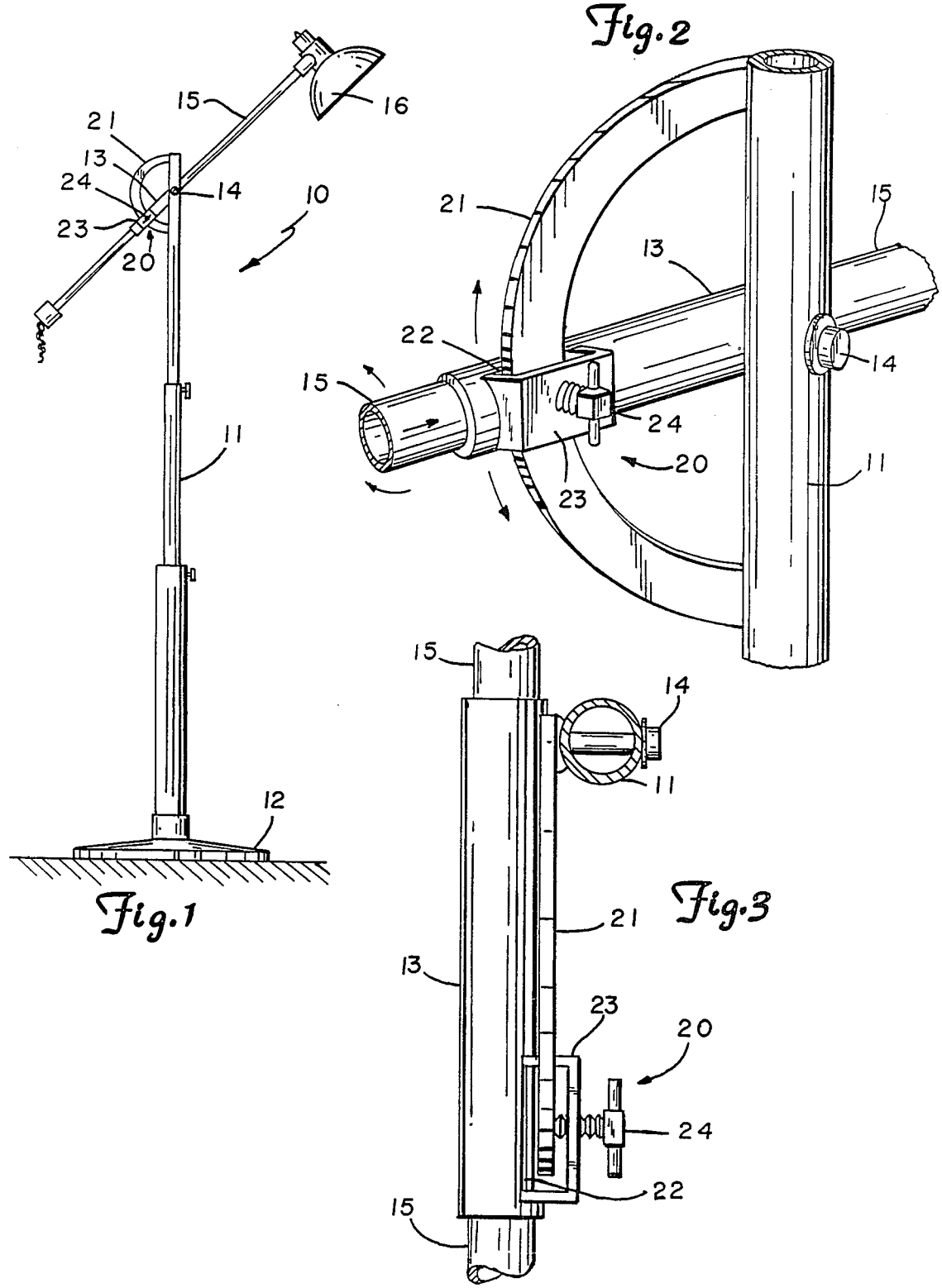

ADJUSTABLE APPLIANCE POSITIONING MECHANISM

BRIEF SUMMARY OF THE INVENTION

The present invention relates to an improved adjustable appliance positioning mechanism. It is particularly useful in conjunction with microphones, lights and other electrical appliances.

A variety of stands and positioning mechanisms are presently known and in use for adjustably positioning items carried by the mechanism. Such items include microphones, lights or lamps, gages, medical instruments and even fishing equipment. The existing positioning mechanisms are complicated and cumbersome, however. Such devices generally consist of a boom arm carried on a stand, the boom arm being angularly positionable as well as longitudinally positionable with respect to the stand. To fix or lock the boom arm in any desired longitudinal or angular position, various types of locking mechanisms are employed. Regardless of the particular type of locking mechanism used, the prior art devices generally employ two separate locking mechanisms; one to lock the boom arm against rotational movement and one to lock the boom against longitudinal movement. As a consequence, the user often has to manipulate two separate locking mechanisms to position the appliance at the desired location.

It is one object of the present invention to provide an appliance positioning mechanism having a boom arm capable of carrying an appliance at its distal end, wherein the boom arm can be locked against rotational and longitudinal movement by a single locking mechanism.

BRIEF DESCRIPTION OF THE DRAWING

FIG 1. is a side elevational view of a stand embodying an adjustable positioning mechanism according to the present invention.

FIG. 2 is an enlarged detailed side elevational view of the adjustable positioning mechanism.

FIG. 3 is a fragmentary top plan view of the present invention.

DETAILED DESCRIPTION OF THE PREFERRED EMBODIMENT

Referring to the drawing, wherein like numbers represent like elements throughout the several views, there is provided an adjustable appliance positioning mechanism generally designated by the numeral 10. The mechanism 10 comprises a standard 11 having a base 12 at its lower end and a tubular sleeve 13 pivotally attached at its upper end. The sleeve 13 is pivotally attached to the standard 11 by pin 14 at its inner end for rotation in a generally vertical plane.

A boom arm 15 is slideably received within the sleeve 13. The sleeve 13 and the boom arm 15 are preferably generally circular in cross section with the diameter of the boom arm 15 being slightly less than the inner diameter of the sleeve 13 to allow the boom arm 15 to be longitudinally positionable with respect to the sleeve 13. The boom arm 15 carries an appliance 16 on one end. The appliance 16 shown in the drawing is a light, although it will be apparent that the present invention is useful in conjunction with a wide variety of appliances, including microphones and different types of gages. It will also be apparent that the appliance 16 need not be rigidly or fixedly attached to the boom arm 15, but rather that the boom arm 15 may include means for attaching and holding of different appliances so that the appliances carried by the boom arm 15 can be varied. Such holding and/or attaching means are well known and need not be described in any greater detail herein.

In this fashion, it will be seen that the appliance 16 can be selectively positioned at a desired location in a vertical plane by pivoting the sleeve 13 to the desired angular position with respect to the standard 11 and moving the boom arm 15 longitudinally in the sleeve 13 until the appliances is located in the desired position. When the appliance has been satisfactorily positioned, the boom arm 15 and the sleeve 13 can be locked in position by a single locking mechanism generally designated 20.

The locking mechanism of the preferred embodiment is best seen in FIGS. 2 and 3. The upper end of the standard 11 carries a semi-circular, arcuate member 21. The arcuate member 21 is attached at its ends to the standard 11 at points on opposite sides of the pin 14 such that the point of pivotal attachment of the sleeve 13 to the standard 11 is midway between the ends of the member 21. The member 21 is preferably comprised of a metal material and has a thickness approximately equal to the thickness of the sleeve 15.

A portion of the outer end of the sleeve 13 is cut away to define a slot 22 located at a distance from the pin 14 approximately equal to the center radius of the member 21. The slot 22 is sufficiently wide that when the elements are arranged in the described manner, a portion of the member 21 will be received in or positioned adjacent to the slot 22 at any point along the pivotal rotation of the sleeve 13.

Formed in the sleeve 13 and overlying the slot 22 is a generally U shaped bracket 23. The bracket 23 and sleeve 13 define an opening in which the member 21 is received. The mid portion of the bracket 23 carries a threaded hole in which a thumbscrew 24 is received. The thumbscrew 24 extends through the bracket 23 inwardly to a point adjacent the member 21. The thumbscrew 24 can be tightened to engage the member 21 thereby deflecting it into frictional engagement with the boom arm 15. When the thumbscrew 24 is sufficiently tightened, the frictional engagement between the thumbscrew 24, the member 21 and the boom arm 15 locks the sleeve in a fixed angular position and the boom in a fixed longitudinal position. When thumbscrew 24 is released, all the various parts are free to move relative to one another. Thus it will be seen that I have provided a single locking mechanism that locks the boom arm 15 against rotational motion about its axis, against rotational motion about the point of pivotal attachment of the sleeve 13 to the standard 11, and against linear longitudinal motion within the sleeve 13, thereby streamlining the operation of the positioning mechanism.

It should also be noted that when the thumbscrew 24 is tightened, the boom 15 is supported at two locations; at the thumbscrew and at the pivot point adjacent pin 14. This two-point support gives the boom 15 greater weight bearing capabilities when compared to prior art devices.

While I have described the preferred embodiment of my invention, it will be apparent to those skilled in the art that other embodiments are possible within the scope of my invention.

What is claimed is:

1. In an adjustable appliance positioning mechanism having a standard with a lower base portion and an upper portion, and an appliance carrying boom supported by said standard and being adjustably positionable with respect to said standard, the improvement in combination therewith comprising:
   a. A tubular sleeve having a first end and a second end, said sleeve first end having a means for pivotal attachment to said upper portion of said standard and having an opening defined in its wall adjacent said second end, said boom being slideably received within said sleeve;
   b. An arcuate member rigidly attached to said upper portion of said standard on opposite sides of said first end of said sleeve and having a radius such that said arcuate member is positioned adjacent said opening in said sleeve; and
   c. Releasable locking means for deflecting said arcuate member through said opening into locking frictional engagement with said boom.

2. An adjustable appliance positioning mechanism according to claim 1, wherein said locking means comprises a bracket overlying said arcuate member oppositely of said opening in said sleeve and having a threaded hole defined therein, and a thumbscrew operable within said threaded hole.

3. In an adjustable appliance positioning mechanism having a standard with a lower base portion and an upper portion, and an appliance carrying boom supported by said standard and being adjustably positionable with respect to said standard, the improvement in combination therewith comprising:
   a. A tubular sleeve having a first end and a second end, said sleeve first end having a means for pivotal attachment to said upper portion of said standard and having an opening defined in its wall adjacent said second end, said boom being slideably received within said sleeve;
   b. An arcuate member rigidly attached to said upper portion of said standard on opposite sides of said first end of said sleeve and having a radius such that said arcuate member is positioned adjacent said opening in said sleeve;
   c. A bracket disposed on said sleeve, overlying said arcuate member oppositely of said opening in said sleeve and having a threaded hole defined therein; and
   d. A thumbscrew operable within said threaded hole.

* * * * *